Patented June 13, 1933

1,913,471

UNITED STATES PATENT OFFICE

MARTIN BEHRENS, OF GIESSEN, GERMANY

PROCESS OF SEPARATING ACTIVE CONSTITUENTS OF ANIMAL GLANDS

No Drawing. Application filed May 29, 1930, Serial No. 457,520, and in Germany June 6, 1929.

The present invention relates to a process of separating the hormone-containing constituents of animal secreting glands from ballast substances.

I have found that one succeeds in a simple manner in isolating individual organized constituents from animal and vegetable tissues and organs, such as for instance glands having internal secretion or single organs from smaller animals or plants, by treating them, after a suitable pre-treatment, with liquids of different specific gravity, the different specific gravity of the organized constituents or organisms rendering the separation possible. The pre-treatment consists in completely eliminating the water from the organs to be examined, for instance by drying in a frozen state, and then comminuting the organs, whereupon, if required, the coarser parts can be separated from the finer parts. It is necessary that the used parts of for instance an animal body should be frozen before the drying process is carried out. The freezing of the said materials can be carried out by means of the usual cooling media, as for instance solid carbon dioxide and ether, liquid air or any freezing mixture. For the treatment with liquids, for instance, mixtures of ether and chloroform are used, but, of course, other mixtures of liquids may also be used. It may also be advantageous to use organic liquids containing water or other additions, for instance in cases where the specific gravities of the constituents to be separated enhance the difficulty of separating on account of the differences being too small. It is only a matter of testing and trying out which liquid or which mixture is the most suitable for the purpose in question.

The real isolation or separation is effected in the following manner:

The dehydrated and comminuted organ is roughly fractionated, by successively treating it with chloroform containing 25, 20, 15, 10, 5 per cent of ether respectively and then with pure chloroform and allowing the mixture to settle, if required with the aid of centrifuging. The floating constituents and those remaining in suspension are poured off in each case. The separate fractions thus obtained are examined for the desired constituent. The suspension containing the desired constituent is, for instance, mixed with a large quantity of ether, allowed to settle and dried, then subjected to a finer fractionation, for instance, by using chloroform containing 15, 14, 13, 12, 11 and 10 per cent of ether.

The process according to my present invention is of great importance in practice, as it permits, for instance in hormone-chemistry, the enrichment of gland fractions in hormones by separating the interior structures, to which the hormone is bound, from the ballast substances. In this manner, for instance, one succeeds in obtaining according to the present process especially active fractions from the thyroid gland and the pancreas.

The following examples serve to illustrate the invention, but they are not intended to limit it thereto.

(1) 1000 grams of beef, as free as possible from fat and connective tissue, are cut into pieces and frozen on a wire in liquid air, in a mixture of solid carbon dioxide and ether or in a refrigerator at about −17° C. Care must be taken that the meat freezes thoroughly; it must remain in the freezing chamber for about 12 hours.

The meat frozen for instance in the refrigerator is now hung up in a desiccator charged with sulfuric acid at a distance of about 5 cm. from the sulfuric acid and kept under a good vacuum for several days. The good heat isolation of the chamber containing rarefied air and the cold produced by evaporation prevent the meat from thawing during the drying process. Experience has shown that 1 kilo of meat is dried in 5–6 days. When the meat is removed after 5 days, its weight amounts to about 245 grams. After cleansing of the surface with a wire-brush and cutting out the readily visible fat and connective tissue, 195 grams remain. The remaining cleansed meat is now passed through a coarse-cutting chopper machine and then through an electrically driven coffee-mill. If the meat does not contain very much fat, the powder is passed through a set of sieves in order to separate the connective tissue and the bloodvessels. If the fat-content makes the powder cohesive this fat must be extracted by ether. The coarsest sieve of the set has a 2.5 mm. mesh, the finest a 0.5 mm. mesh. The passage of the powder can be accelerated by inserting glass beads between the several sieves. The yield of finest powder, which mainly consists of muscle cells, amounts to 114 grams. The residue consists of connective tissue and parts of bloodvessels which represent a fibrous mass.

The parenchyma powder is then placed into a bottle with ether, if desired, with the ether of the fat extraction already containing parenchyma powder. By the repeated fractionating deposition in ether, the parenchyma powder which is already sufficiently pulverized and which consists of free protoplasma and of free nuclei, is separated from the coarser parenchyma powder, which consists of still connected parts of protoplasma and nuclei. It has been empirically ascertained that the coarser power has, on an average, a velocity of far greater than one cm. per ½ minute, whereas that of the nuclei and parts of protoplasma free from nuclei is less than one cm. in half a minute. The quantity of ether to be used depends upon the quantity of fine powder obtained, because the fine powder must not exceed a certain concentration, lest the velocity of deposition be retarded in an uncontrollable manner by a crowding together of the separate particles, rendered obvious by precipitation in a distinct zone. Further quantities of fine parenchyma powder can be obtained from the coarser parenchyma powder by further grinding, for instance with glass beads and subsequent fractionated settling. For this purpose the ether-containing liquid which ether was withdrawn from the first sediment is also preferably used, as a certain liquid-content of the ether prevents agglutination phenomena, which would prevent proper separation by the levigation.

The fine parenchyma powder thus obtained consists of free nuclei and of parts of protoplasma, the greater part of which is considerably larger than the nuclei themselves. These larger parts of protoplasma are separated by sedimenting three times in ether, the rate of falling amounting to 1 cm. per minute and the powder richer in nuclei thus obtained is once more allowed to deposit three times at the rate of 3 minutes per cm.

When filtering by suction the parenchyma powder enriched in nuclei from the ether, care must be taken that the powder is never filtered by suction in a dry state, in order to avoid cooling by evaporaton of the ether and at the same time moistening the parenchyma powder. The filtered parenchyma powder which is not completely dry, is quickly wrapped into filter paper and dried overnight in the sulfuric acid desiccator. The yield of dry parenchyma powder amounts to about 20 grams.

The dried organs and powders of organs must always be kept in the desiccator. Only during the coarse comminution and the sifting are they exposed to air for a prolonged period. The reasons therefor are various: The drier the organs are, the smaller is the probability of subsequnet chemical changes. If, furthermore, the powders of the organs are not completely dry, different portions of the hygroscopic powder may have varying water content, so that on account of the accidentally varying water content displacements of the specific gravity occur, which render a separation into the different structures impossible. Moist organs are less brittle than dry ones, they can, therefore, only be ground with difficulty. Moist powders of organs cannot be sifted, because the perforations of the sieve quickly become clogged. Finally, powders of organs which have been exposed to the air for a short time, cannot be brought into suspension, because the particles cohere together.

For the further differentiation, mixtures of ether and chloroform are used as separating liquids. The liquids which can be used for the purpose of this invention range in practice from pure chloroform, the liquid with the greatest specific gravity, to a mixture of ether and chloroform containing 25 per cent by volume of ether, with a difference of 1% in each case. In order to avoid the storage of so many mixtures, the single solutions are preferably prepared shortly before use by mixing chloroform and chloroform containing 30% of ether. I take chloroform containing 30% of ether, because the quantities which are to be mixed can be measured in a simpler manner, and because the troublesome self-heating, which occurs when mixing pure ether with pure chloroform, is avoided. The two stock solutions stand above calcium chloride and are drawn off by means of automatic burettes.

The actual separation is in principle effected in the following manner: The powdered organ is first coarsely fractionated by centrifuging it consecutively with chloroform containing 25, 20, 15, 10, 5 per cent of ether and pure chloroform. The matter floating on the liquid and remaining in suspension is poured off in each case. The single fractions thus obtained are examined for the constituent wanted. The suspension, containing the constituent desired, is mixed with a large quantity of ether, centrifuged until the constituent is deposited and the latter dried, then subjected to a finer fractionation. If, for instance, the material desired was found in the fraction, which remained in suspension when centrifuging with chloroform containing 10% of ether, it is then centrifuged consecutively with chloroform containing 15, 14, 13, 12, 11 and 10 per cent of ether. I then examine, in which fraction the desired constituent is present in greatest purity.

In order to isolate the muscular nuclei, the prepared powdered organ (20 grams) is suspended by briefly and energetically shaking in a 300 cc. Erlenmeyer flask in 150 cc. of chloroform containing 20% of ether. The powder suspension is then centrifuged for one hour in two centrifuge glasses each of a capacity of about 90 cc. in a centrifuge which is well ventilated, that is to say which does not run hot while in operation (temperature in the centrifuge about 23° C.). The centrifuge glasses must be provided with well closing lids, owing to the risk of evaporation. After centrifuging, the powder cake floating on the surface, is cautiously comminuted with a spatula, detached from the sides of the glass and poured into a beaker together with the liquid above the sediment. Before the sediment can dry it is covered with chloroform containing 15% of ether. The matter which has been poured off, mainly consisting of protoplasma, is again suspended in an Erlenmeyer flask and once more centrifuged for ½ hour in order to separate nuclei which have been carried over. After the liquid has been poured off, all sediments are combined in a centrifuge glass of 90 cc. and centrifuged for 4 hours with chloroform containing 15 per cent. of ether. After having poured off the liquid, the sediment is centrifuged for 4 hours with chloroform containing 10 per cent of ether in a smaller centrifuge glass. The residue remaining in suspension and the powder cake which may have separated, are poured off, mixed with ether and centrifuged in a small centrifuge glass until settled. The sediment is washed twice with ether in the centrifuge and dried over-night in the sulfuric acid desiccator, yield: 0.32 gram of almost pure nuclei. In order to obtain still purer nuclei, the powder is consecutively centrifuged with chloroform containing 15, 14, 13, 12, 11, 10 per cent of ether, each time for 4 hours. The single fractions thus obtained differ from one another by reason of their varying content of impurities. The purest fraction of nuclei is dried and once more centrifuged for 4 hours with the mixture of ether and chloroform in which it is settled, then the sediment is centrifuged similarly with the mixture, in which it still remained in suspension. The yield amounts to about 0.2 gram. Between which mixtures the purest fraction exists, depends on the temperature during centrifugaing in the centrifuge glasses.

The content of nuclei in the single fractions is examined by spreading tests on glass plates, coloring them by the nucleus staining method and subsequently staining for 5 minutes in a 1 per cent naphthol-green solution. Preparations of unseparated tissue powder and pure protoplasma become green, whereas nuclear suspensions treated in the same manner become deep violet.

(2). Thyroid glands of pigs as fresh as possible are separately introduced into a mixture of solid carbon dioxide and ether of about −70° C. and then hung in a mul-bag in the sulfuric acid desiccator, which is exhausted to about 0.2 mm. of mercury and kept for 8 days under this reduced pressure. The glands dried in this manner in a frozen state are then removed from the bag and cut into pieces of about 1 cc., the fat and coarse connective tissue being removed as far as possible. The glands thus cut are ground in a coarse-grinding mill and passed through a set of sieves, the finest of which has a 0.5 mm. mesh. The coarse powder which does not pass through the finest sieve, is ground once more and again sifted. This operation is repeated until all gland substances have passed the finest sieve.

100 grams of the gland powder thus obtained are suspended in ether in a 1½ liter bottle and the finer powder is separated from the coarser by settling. For this purpose, the bottle, after it has been shaken, is allowed to stand for 0.1 minute per cm. of actual height of fall (distance between the ether surface and the surface of the sediment forming subsequently) and the ether suspension is drawn with a siphon from the sediment (sediment I) into a 3 liter flask. This operation is carried out three times. The drawn-off suspensions are allowed to stand for 12 hours in a three liter flask, which has an actual height of fall of 18 cm. The sediment that has then formed (sediment II) mainly consists of follicle contents (colloid), whereas sediment I mainly consists of connective tissue and cells of the follicle wall. After 12 hours, the ether together with the matter remaining in suspension is drawn off from the three liter flask. The remaining sediment II is freed from the main quantity of ether in a filtering flask by filtering by suction, and dried for 12 hours in the sulfuric acid desiccator. The yield amounts to about 37 grams. The residue remaining in suspension is likewise filtered by suction and dried. The yield amounts to about 2 grams, in sediment I to about 30 grams. The colloid-containing sediment (sediment II) is then systematically separated into fractions of different specific gravities by centrifuging in mixtures of ether and chloroform of different specific gravities, whereby fractions are obtained which almost exclusively consist of colloid. For this purpose, the powder is first suspended in 600 cc. of chloroform containing 22 per cent by volume of ether and centrifuged for 4 hours in a closed centrifuge at a temperature of 23,5° C. The residue remaining in suspension is poured off, filtered by suction and dried. The sediments are likewise dried in the sulfuric acid desiccator. The dried sediments are then successively centrifuged in a corresponding manner with chloroform containing 20, 19 and 18 per cent of ether, the residue poured off, filtered by suction and dried.

*Yields*

| | | |
|---|---|---|
| 22% on top | 0.8 | gram containing much blood |
| 20% on top | 0.35 | gram containing blood |
| 19% on top | 6.2 | grams nearly pure colloid |
| 18% on top | 20.2 | grams nearly pure colloid |
| 19% below | 6.6 | grams colloid, cells and connective tissue. |

The dried sediment I is shaken for 1 hour in a liter flask with 500 cc. of ether and 250 grams of glass beads on a shaking machine. By this mild grinding another quantity of colloid is freed from the collicles and separated by levigating three times in a 1.5 liter flask (0.1 minute per cm height of fall). The residue is then shaken for 8 hours in a liter flask with 500 grams of glass beads and a small quantity of ether. By this intensive grinding, the follicle cells are separated from the connective tissue. By levigating three times (0.5 minute per cm height of fall) the cells are separated from the connective tissue.

The cell powder, which still contains colloid, blood, connective tissue and free cell nuclei, is decomposed in the manner above indicated into fractions of different specific gravities and thus fractions rich in cells are obtained.

I claim:

1. A process for separating the hormone-containing constituents of animal secreting glands from ballast substances insoluble in a mixture of ether and chloroform which comprises sedimenting fractionally the secreting gland in a dried and finely comminuted state by means of mixtures of ether and chloroform of different specific gravities.

2. A process for separating the hormone-containing constituents of animal secreting glands from ballast substances insoluble in a mixture of ether and chloroform, which comprises sedimenting fractionally the secreting gland, after drying it in a vacuum and finely grinding it, by means of mixtures of ether and chloroform of different specific gravities.

3. A process for separating the hormone-containing constituents of thyroid glands from ballast substances insoluble in a mixture of ether and chloroform, which comprises sedimenting fractionally the thyroid gland in a dried and finely comminuted state by means of mixtures of ether and chloroform of different specific gravities.

4. A process for separating the hormone-containing constituents of thyroid glands from ballast substances insoluble in a mixture of ether and chloroform, which comprises sedimenting fractionally the thyroid gland, after drying it in a vacuum and finely grinding it, by means of mixtures of ether and chloroform of different specific gravities.

In testimony whereof, I affix my signature.

MARTIN BEHRENS.